United States Patent
Pu et al.

(10) Patent No.: US 9,313,700 B2
(45) Date of Patent: Apr. 12, 2016

(54) FAST HANDOVER METHOD FOR CROSS SECTOR SCENARIO IN MOBILE COMMUNICATION SYSTEMS

(71) Applicant: Intel Mobile Communications GmbH, Neubiberg (DE)

(72) Inventors: Tianyan Pu, Dresden (DE); Thomas Fliess, Dresden (DE); Matthias Hofmann, Freital (DE)

(73) Assignee: Intel Deutschland GmbH, Neubiberg (DE)

( * ) Notice: Subject to any disclaimer, the term of this patent is extended or adjusted under 35 U.S.C. 154(b) by 115 days.

(21) Appl. No.: 13/832,947

(22) Filed: Mar. 15, 2013

(65) Prior Publication Data
US 2014/0274052 A1    Sep. 18, 2014

(51) Int. Cl.
*H04W 36/00* (2009.01)

(52) U.S. Cl.
CPC ................................ *H04W 36/0083* (2013.01)

(58) Field of Classification Search
None
See application file for complete search history.

(56) References Cited

U.S. PATENT DOCUMENTS

| | | | |
|---|---|---|---|
| 2009/0232125 A1* | 9/2009 | Kim et al. | 370/350 |
| 2010/0182966 A1* | 7/2010 | Kishiyama et al. | 370/329 |
| 2011/0065432 A1* | 3/2011 | Iwamura | 455/434 |

* cited by examiner

*Primary Examiner* — Suhail Khan
(74) *Attorney, Agent, or Firm* — Schwegman Lundberg & Woessner, P.A.

(57) ABSTRACT

A method for handover in a mobile communication system, wherein cell search is performed by determining cell identities based on cell identity information transmitted within downlink data is provided. The cell power of cells detected by cell search is measured. Moreover, the cell power of an additional cell is measured, the additional cell having a cell identity that is related to a cell identity of a cell detected by cell search in that the additional cell and the cell detected by cell search are adjacent cells. The method is applicable in cross-sector scenarios avoiding call drops due to lengthy cell detection.

11 Claims, 4 Drawing Sheets

Cell ID list from list administrators for measurement

| Cell 0 |
| Cell 1 |
| ... |
| Cell N-1 | adding another two sectors (cells with same cell group ID) →

Final Cell ID list for measurement

| Cell 0 |
| Cell 1 |
| ... |
| Cell N-1 |
| Cell N |
| Cell N+1 |

FAST HANDOVER METHOD FOR CROSS SECTOR SCENARIO IN MOBILE COMMUNICATION SYSTEMS

BACKGROUND OF THE INVENTION

In a mobile communication system, a mobile device wishing to access a cell first undertakes a cell search procedure. In a mobile communication system, such as LTE, the cell search procedure comprises a series of synchronization stages by which the mobile device (UE in the terminology of LTE) determines time frequency parameters that are necessary to demodulate the downlink and to transmit uplink symbols with the correct timing. Specifically, each cell in the system needs to be uniquely identified if the mobile device wishes to connect to a cell or if the mobile device is already connected to a cell but wishes to connect to another LTE cell. The latter scenario is referred to as a handover. For this purpose the base station transmits its cell-id within downlink data. The cell-id of the base station is detected by the mobile device when performing cell search. However, the handover procedure has problems in a cross sector scenario when the mobile device is moving in a fast speed as the cell-id detection takes some time resulting in a call drop. The cell-id of an adjacent cell to which the mobile device wishes to connect cannot be easily detected in advance to crossing the sector boundary as the beam of the adjacent cell may not be visible to the mobile device due to sectored beam forming of the mobile station.

BRIEF DESCRIPTION OF THE DRAWINGS

Reference will be made to the accompanying drawings.

DETAILED DESCRIPTION OF THE INVENTION

The present disclosure relates a method and a device for fast handover in a cross sector scenario in mobile communication systems. The present disclosure specifically relates to a method and a mobile device for fast handover in cellular mobile communication systems.

On implementation relates to a method for fast handover in an E-UTRA/LTE UE mobile device and related mobile device, based on blind measurement of cells that have not been detected by primary cell detection.

One aspect of the present disclosure relates to a method for handover in a mobile communication system, wherein cell search is performed by determining cell identities based on cell identity information transmitted within downlink data. The cell power of cells detected by cell search is measured. Moreover, the cell power of an additional cell, preferably two additional cells, is measured, the additional cell having a cell identity that is related to a cell identity of a cell detected by cell search in that the additional cell and the cell detected by cell search are adjacent cells.

The method is advantageously applicable in cross-sector scenarios avoiding call drops due to lengthy cell detection.

Figure 1:
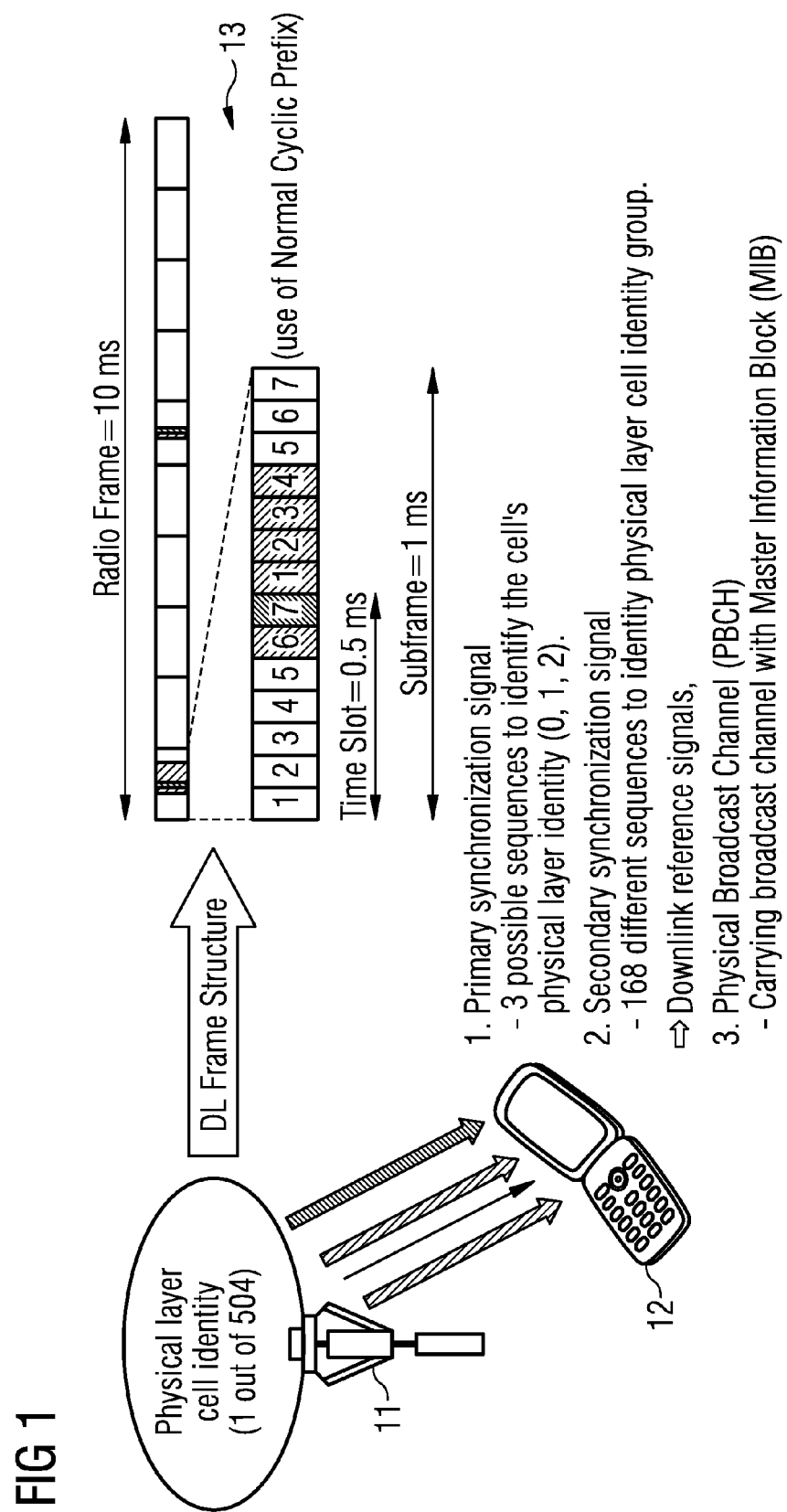
FIG. 1 shows a diagram of an LTE system.
Figure 2:
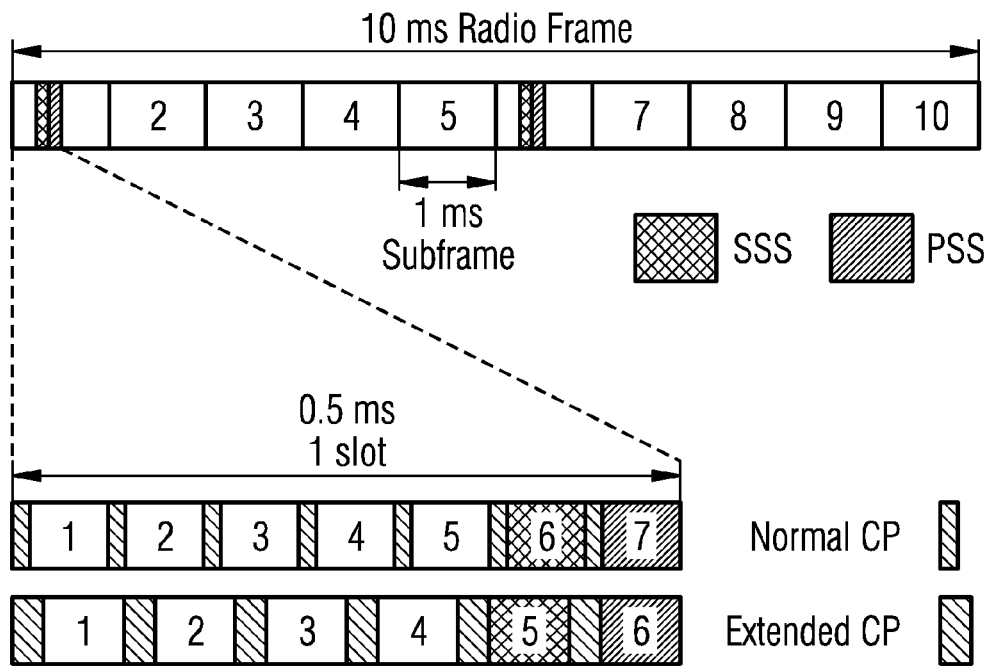
FIG. 2 shows a PSS and SSS frame and slot structure in the FDD case of an LTE frame.
Figure 3:
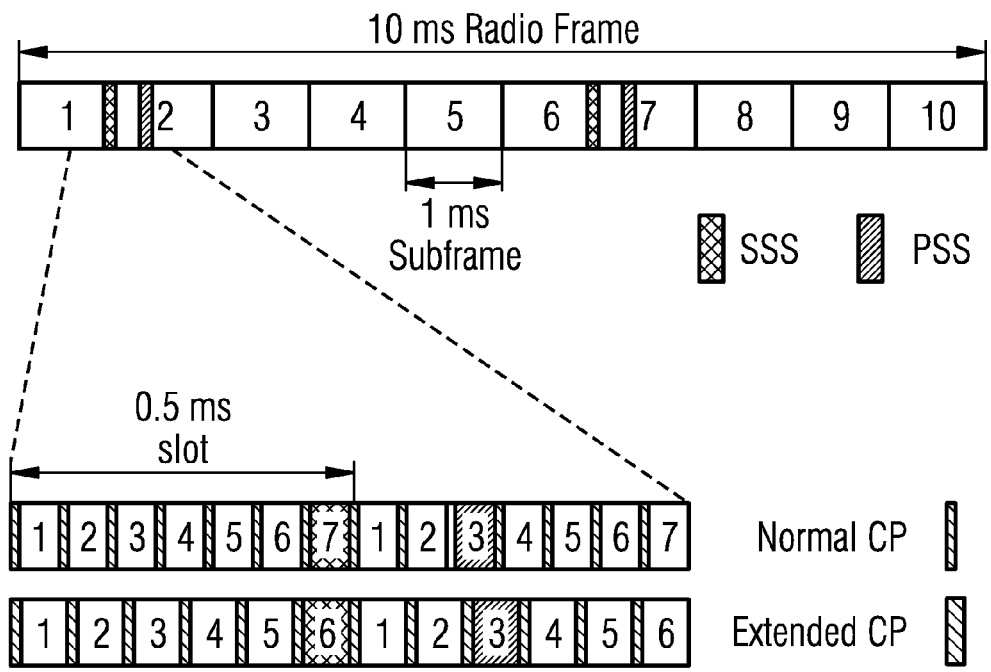
FIG. 3 shows a PSS and SSS frame and slot structure in the FDD case of an LTE frame.

FIG. 1 shows a base station 11 and mobile device 12 in a mobile communication system such as LTE. For base station identification the base station 11 transmits a cell identity (cell-ID) within the Primary Synchronization Signal (PSS) and Secondary Synchronization Signal (SSS) of an LTE radio frame 13. The allocation of the PSS and SSS within one radio frame in time domain is shown for the Frequency Division Duplex case in FIG. 2 and for the Time Division Duplex case in FIG. 3. The sequences are transmitted twice within a 10 ms radio frame, hence, every 5 ms. There are 504 unique physical layer cell identities in mobile communication systems, such as LTE, grouped into 168 groups of three identities. Three PSS sequences are used to indicate the cell identity within the group and 168 SSS sequences are used to indicate the identity of the group.

Once a cell has been detected, measurements are made in order to make a handover decision. In a mobile communication system, such as LTE, cell measurements are based on cell specific reference signal (CRS) receive power. CRS are subcarriers multiplexed into a time-frequency grid of a downlink transmission scheme that carrys reference symbols. Reference symbols are data symbols which are known at the receiver and are used for parameter estimation tasks. A plurality of reference symbols modulated on CRS form a reference symbol sequence that also carries unambiguously one of the 504 different cell identities $N_{cell\text{-}id}$ as well as the cyclic prefix (CP) mode as the reference symbol sequence is derived from a pseudo random sequence generated by a scrambling sequence generator that is initiated depending on the cell-id.

Figure 4:
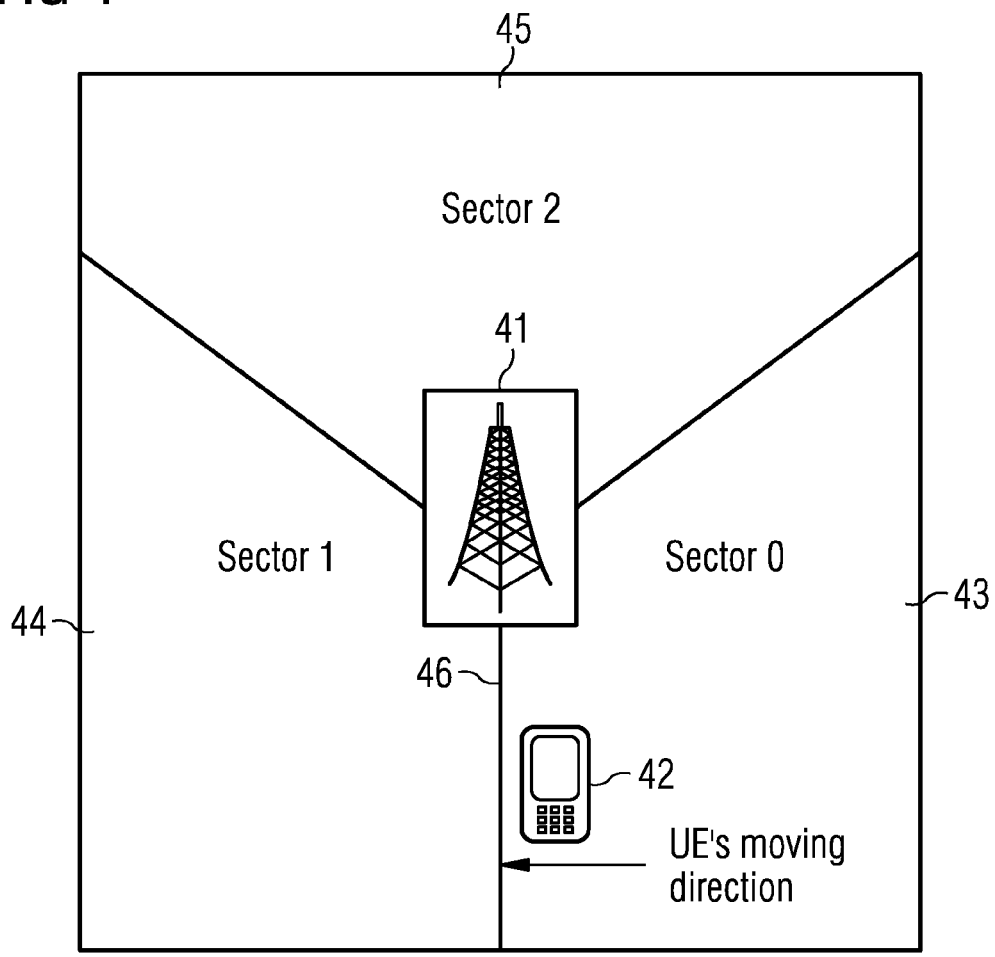
FIG. 4 shows a cross sector scenario.

However, the handover procedure described above causes problems in a cross sector scenario as shown in FIG. 4. A base station 41 serves three sectors: sector zero 43, sector one 44 and sector two 45. To reduce interference among the three sectors, the base station normally uses different beam-forming patterns for each sector, potentially with a small overlapping at the sector boundary. Such a signal isolation method via beam-forming serves a very efficient way to mitigate inter-sector interference. However, it also causes handover problems when high-speed user equipment (UE) 42 moves across the sector boundary 46 as shown in FIG. 4.

The signal from the current sector (sector zero 43) drops rapidly when a UE is leaving for its neighboring sector (sector one 44), while the UE cannot detect and measure the neighboring sector (sector one 44) well in advance due to signal isolation. Hence, the cell-id of sector one 44 needs to be determined and the cell of sector one 44 to be measured in a very short time when the UE is able to receive the beam of sector one 44. However, a typical cell detection procedure as described above typically takes up some time resulting in a call drop.

Figure 5:
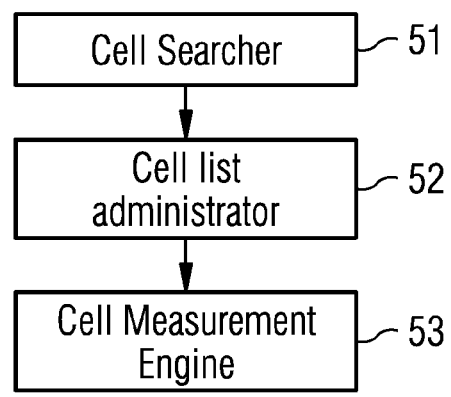
FIG. 5 shows a handover procedure.

In the present disclosure, a method for fast handover in an E-UTRA/LTE UE mobile device and related mobile device, based on blind measurement of cells that have not been detected by primary cell detection is provided. Generally, a handover procedure involves three blocks inside a UE as shown in FIG. 5. Cell searcher 51 is responsible for finding cells based on primary and secondary synchronization sequences inside downlink data. Cell list administrator 52 is responsible for cell list management for all cells detected by the cell searcher 51 or measured so far. Cell measurement engine 53 is responsible for cell measurement based on cell specific reference signals.

Figures 6, 7:
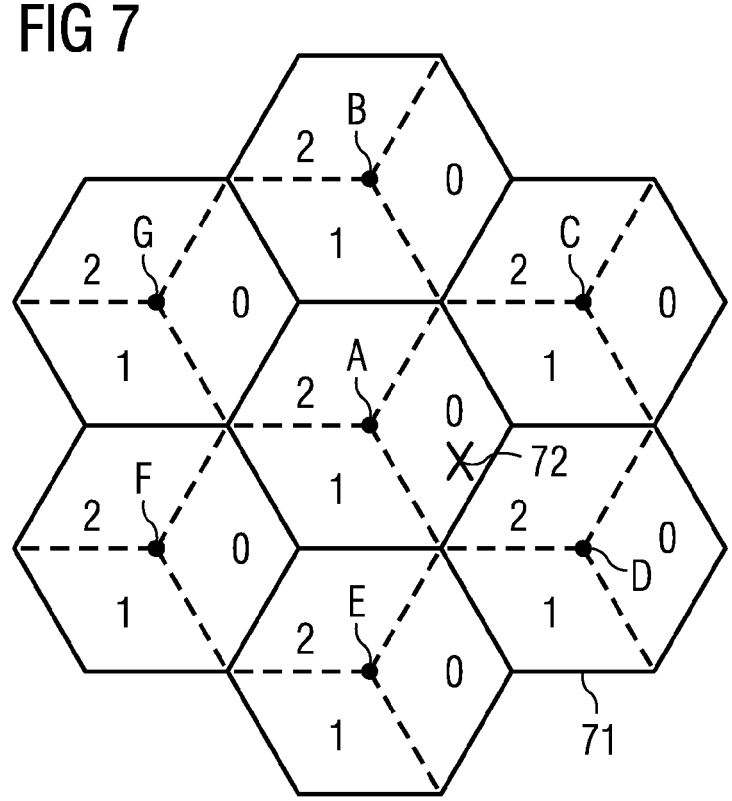
FIG. 6 shows an augmented handover procedure according to the present disclosure.
FIG. 7 shows cells of a cellular mobile communication system.

In order to handover to a new sector/cell, the cell searcher 51 needs to find it in a conventional handover procedure. Once the cell list administrator 52 gets the new cell's information from cell searcher 51, it will schedule the measurement request with cell measurement engine 53. Based on the measurement results, the UE will decide whether to move service from current serving cell to one of its neighboring cells. Normally, the cell search will take some time as the synchronization signal is periodic In the present disclosure, handover procedure is augmented by a blind measurement based approach in order to speed up handover procedure, thus reducing the call drop rate in the cross-sector scenario. Referring to FIG. 6, an exemplary cellular list is depicted. As shown in FIG. 6, instead of just measuring detected cells 0 to N−1 from the cell searcher 51 as shown in FIG. 5, additional cells N and N+1 having the same cell group-ID as detected cells are added for measurement.

Also shown in FIG. 6, the cell N−1 is supposed to be the currently serving cell and another two cells having same cell group ID as serving cell, denoted as cell N and N+1, are not in the cell list from cell list administrator 52 in FIG. 5. Referring back to FIG. 3, the sectors, indicated by their sector-id 0, 1 or 2, that are served by the same base station have the same group-id in a mobile communication system, such as an LTE system. Thus, each sector corresponds to a cell with a specific cell-id being composed of sector-id and group-id.

The measurement engine 53 adds cells having same cell group ID as serving cell, such as cells N and N+1 to the measurement list and performs measurement blindly for them. With such a blind measurement, the entering sector can be detected and measured in a much faster way since cell search time is avoided in such a procedure in the cross-sector scenarios, leading to a lower call drop rate. The blind measurement can be based on CRS receiver power. Typically, cell measurement is much faster than cell detection. Hence, a speed up of multiple times is achievable.

Further, additional cells can be added to the cell measurement list by the cell list administrator 52 instead of by the measurement engine 53. Thus, the measurement engine 53 does not need to be aware of whether the cell in the list is a detected one or a blindly added one.

Instead of just adding two cells sharing the same cell group ID as the serving cell, more cells with same cell group ID as the few strongest neighboring cells can be added for blind measurement. Referring to FIG. 7, a group of cells having the same group-id is indicated by solid lined hexagonals 71, while the sectorization is indicated by dashed lines and the respective sector-id 01, 1 and 2. The base station is indicated by capital letters A, B, . . . G and related to a group of cells having the same group-id. A UE 72 is currently located in cell A0. Thus it is served by base station A. Assuming the cell searcher detected cells A0, C1, D2, B1 and E1 in the order of their cell power, then the cell list may be augmented not only with cells A1 and A2 but also with cells C0, C2, D1 and D0 for example, as these additional cells have the same group-ID as the cells A0, C1 and D2 of a plurality of cells having strongest power.

Simple and effective solution for handover, specifically in cross sector scenarios, with low computational complexity is therefore provided.

This disclosed method may be applied to any cellular communication system in addition to 4G wireless communication systems. The cell measurement is performed blindly for cells in the vicinity of the UE, even though those cells could not have been detected by primary cell detection.

It is therefore an advantage to provide a fast handover procedure to avoid call drops in cross sector scenarios.

What is claimed is:

1. A method performed by a mobile device for faster cross-sector handover in a mobile communication system, comprising:

searching for and detecting a plurality of cells using a cell searcher of a mobile device by determining an identity of the cells based on cell identity information conveyed by one or more periodic synchronization signals to provide a cell list of detected cells, the one or more periodic synchronization signals include a primary synchronization signal (PSS) and a secondary synchronization signal (SSS) transmitted periodically within an LTE radio frame;

providing the cell list to a cell list administrator of the mobile device;

augmenting the cell list with a cell ID of an additional cell not detected by the cell searcher using the cell list administrator, the additional cell having a same group ID and being associated with a same base station of at least sonic of the cells on the cell list;

measuring a power level of cell-specific reference signals (CRS) of at least some of the cells of the cell list that have been detected, the power level measurement using a cell measurement engine of the mobile device;

performing a blind measurement of a power level of a CRS of the additional cell that had not been detected, the CRS including a cell ID of an associated cell, the power level measurement using the cell measurement engine; and initiating a cross-sector handover to the additional cell that had not been detected based on the power level measurement of the associated cell-specific reference signal the cross-sector handover being a handover to a cell served by the same base station.

2. The method according to claim 1, wherein the additional cell and one cell of the plurality of cells are adjacent cells.

3. The method according to claim 1, wherein the identity of the additional cell is further related to the plurality of cells of the cell list, wherein the additional cell and at least one detected cell are served by a common base station.

4. The method according to claim 3, wherein the identity of the additional cell is further related to an identity of the plurality of cells of the cell list wherein at least one detected cell is a currently serving cell.

5. The method according to claim 1, wherein an identity of the additional cell is related to an identity of the plurality of cells of the cell list having maximum cell power.

6. The method according to claim 1, wherein the group ID of the additional cell is the same as a group-id of a cell of the cell list having strongest power.

7. The method according to claim 1, wherein the cell list is augmented with cell identities of cells that are adjacent to and served by a base station serving a cell with a cell identity contained within said cell list, and wherein cell power measurement is based on said cell list.

8. A mobile device, comprising:

a cell searcher configured to detect a plurality of cells in a cellular communication system to determine an identity of the cells based on cell identity information conveyed by one or more periodic synchronization signals to provide a cell list of detected cells, the one or more periodic synchronization signals include a primary synchronization signal (PSS) and a secondary synchronization signal (SSS) transmitted periodically within an LTE radio frame;

a cell list administrator configured to administer the cell list and to augment the cell list with a cell ID of an additional cell not detected by the cell searcher, the additional cell having a same group ID and being associated with a same base station of at least some of the cells on the cell list; and a cell measurement engine configured to measure a power level of cell-specific reference signals (CRS) of at least some of the cells of the cell list that have been detected, and perform a blind measurement of a power level of a CRS of the additional cell that had not been detected, the CRS including a cell ID of an associated cell; and processing circuitry to initiate a cross-sector handover to the additional cell that had not been detected based on the power level measurement of the associated cell-specific reference signal the cross-sector handover being a handover to a cell served by the same base station.

9. The mobile device according to claim 8, wherein the additional cell and one detected cell of the cell list are adjacent cells.

10. The mobile device according to claim 9, wherein the additional cell and the one cell detected by the cell searcher are served by a common base station.

11. The mobile device according to claim 8, wherein the list is augmented with all additional cells having an identity that is related to the identity of the plurality cells detected by the cell searcher in that the additional cells and one detected cell list are adjacent cells and are served by a common base station.

\* \* \* \* \*